United States Patent
Homma et al.

(10) Patent No.: US 11,758,916 B2
(45) Date of Patent: Sep. 19, 2023

(54) FAT COMPOSITION

(71) Applicant: KAO CORPORATION, Tokyo (JP)

(72) Inventors: Rika Homma, Sumida-ku (JP); Yui Ishikawa, Odawara (JP)

(73) Assignee: KAO CORPORATION, Tokyo (JP)

( * ) Notice: Subject to any disclaimer, the term of this patent is extended or adjusted under 35 U.S.C. 154(b) by 362 days.

(21) Appl. No.: 16/471,189

(22) PCT Filed: Dec. 21, 2017

(86) PCT No.: PCT/JP2017/045926
§ 371 (c)(1),
(2) Date: Jun. 19, 2019

(87) PCT Pub. No.: WO2018/117216
PCT Pub. Date: Jun. 28, 2018

(65) Prior Publication Data
US 2019/0373909 A1 Dec. 12, 2019

(30) Foreign Application Priority Data

Dec. 22, 2016 (JP) ................................. 2016-248980

(51) Int. Cl.
A23D 9/04 (2006.01)
A23K 20/158 (2016.01)
A23L 33/115 (2016.01)
C11C 3/02 (2006.01)

(52) U.S. Cl.
CPC .............. *A23D 9/04* (2013.01); *A23K 20/158* (2016.05); *A23L 33/115* (2016.08); *C11C 3/02* (2013.01); *A23V 2002/00* (2013.01)

(58) Field of Classification Search
CPC ....... A23D 9/04; A23K 20/158; A23L 33/115; C11C 3/02
See application file for complete search history.

(56) References Cited

U.S. PATENT DOCUMENTS

| | | | |
|---|---|---|---|
| 5,672,726 A | 9/1997 | Ryu et al. | |
| 2002/0045000 A1 | 4/2002 | Nakajima et al. | |
| 2003/0054082 A1 | 3/2003 | Koike et al. | |
| 2004/0265466 A1 | 12/2004 | Takase et al. | |
| 2006/0258872 A1 | 11/2006 | Kase et al. | |
| 2011/0206804 A1* | 8/2011 | Kase | C12P 7/6418 426/33 |
| 2014/0220223 A1* | 8/2014 | Homma | C11C 3/06 426/607 |
| 2014/0234520 A1* | 8/2014 | Homma | A23D 9/007 426/601 |

FOREIGN PATENT DOCUMENTS

| | | |
|---|---|---|
| CN | 1179026 C | 12/2004 |
| EP | 1 211 305 A1 | 6/2002 |
| EP | 2 894 215 A1 | 7/2015 |
| JP | 8-116878 A | 5/1996 |
| JP | 8-208531 A | 8/1996 |
| JP | 2001-40386 A | 2/2001 |
| JP | 2002-138296 A | 5/2002 |
| JP | 2002-138297 A | 5/2002 |
| JP | 2002-322490 A | 11/2002 |
| JP | 2003-79314 A | 3/2003 |
| JP | 2003-160794 A | 6/2003 |
| JP | 2006-328383 A | 12/2006 |
| JP | 2016-168040 A | 9/2016 |
| WO | WO 2009/019893 A1 | 2/2009 |

OTHER PUBLICATIONS

Extended European Search Report dated Apr. 22, 2020 in Patent Application No. 17884420.5, citing documents AA, AB, AO and AP therein, 6 pages.
International Search Report dated Feb. 6, 2018 in PCT/JP2017/045926 filed Dec. 21, 2017.
Kim, N. et al., "Singlet Oxygen-Related Photooxidative Stability and Antioxidant Changes of Diacylglycerol-Rich Oil Derived from Mixture of Olive and Perilla Oil," Journal of Food Science, vol. 77, No. 11, 2012, pp. C1185-1191.
Diacylglycerol oil, editors Yoshihisa Katsuragi et al., AOCS Press, 2004, Ch.: Physicochemical Properties, Y. Nakajima et al., pp. 186-187; and the colophon of the "Diacylglycerol oil."
Fat and Oil Melt Point Temperatures, available from URL http://www.veganbaking.net/articles/tools/fat-and-oil-melt-point-temperatures accessed Aug. 21, 2021, 8 pages.
Seong-Koon Lo et al., "Diacylglycerol Oil—Properties, Processes and Products: A Review," Food Bioprocess Technol., 1:223-233 (2008).

* cited by examiner

*Primary Examiner* — Stephanie A Cox
(74) *Attorney, Agent, or Firm* — Oblon, McClelland, Maier & Neustadt, L.L.P.

(57) ABSTRACT

Provided is a fat or oil having a high diacylglycerol content and rich in α-linolenic acid, in which crystallization at low temperature is suppressed, and which hardly causes white turbidity or deposition. Specifically, provided is a fat or oil composition, which satisfies the following (1) to (4): (1) a content of α-linolenic acid in constituent fatty acids of a fat or oil is 40 mass % or more; (2) a total content of a saturated fatty acid having 16 carbon atoms and a saturated fatty acid having 18 carbon atoms in the constituent fatty acids of the fat or oil is 6 mass % or less, and a content of the saturated fatty acid having 18 carbon atoms in the constituent fatty acids of the fat or oil is less than 3 mass %; (3) a content mass ratio of the saturated fatty acid having 16 carbon atoms (P) to the saturated fatty acid having 18 carbon atoms (S), [(P)/(S)], in the constituent fatty acids of the fat or oil is 0.1 or more and less than 3.5; and (4) a content of diacylglycerols is 25 mass % or more.

20 Claims, No Drawings

FAT COMPOSITION

FIELD OF THE INVENTION

The present invention relates to a fat or oil composition rich in α-linolenic acid.

BACKGROUND OF THE INVENTION

Many studies have been made on functions of fatty acids in fats or oils in response to increasing health consciousness in recent years. For example, it has been reported that ω3 fatty acids, such as α-linolenic acid (C18:3, ALA) and docosahexaenoic acid (C22:6, DHA), have preventive effects on coronary artery disease, apoplexy, or the like. The ω3 fatty acids cannot be synthesized in vivo, and a lack thereof causes dermatitis or the like. Therefore, it is desired that a fat or oil containing a large amount of the ω3 fatty acids be utilized. In 2005, the Ministry of Health, Labour and Welfare of Japan specified a recommended intake (adults) of 1 g/day in total for the ω3 fatty acids, such as α-linolenic acid.

Meanwhile, it has been reported that a fat or oil containing diacylglycerols at a high concentration has physiological actions. For example, a postprandial increase in blood triglycerides (neutral fats) is suppressed, and an accumulation amount in the body is small.

In view of the foregoing, in order to effectively exert physiologically active functions of α-linolenic acid and diacylglycerols, there have conventionally been proposed, for example, a fat or oil composition containing 40 wt % to 99.7 wt % of diglycerides and the like, in which a ω3 unsaturated acyl group content and a monoenoic acyl group content in constituent acyl groups of the diglycerides are from 15 wt % to 89.5 wt % and from 10 wt % to 84.5 wt %, respectively (Patent Document 1), a fat or oil composition containing 5 wt % to 100 wt % in total of monoglycerides and diglycerides in which 15 wt % to 90 wt % of constituent fatty acids are ω3 fatty acids, the fat or oil composition having an oxidative stability index (Rancimat induction time at 100° C.) of 7 or more (Patent Document 2), a fat or oil composition containing 60 wt % to 100 wt % of diglycerides in which 15 wt % to 90 wt % of constituent fatty acids are ω3 fatty acids having less than 20 carbon atoms, and in which a weight ratio of "cis ω3 fatty acids/(cis ω6 fatty acids+saturated fatty acids+trans fatty acids)" is from 1 to 6 (Patent Document 3), and a fat or oil composition containing 5 wt % to 59.9 wt % of diglycerides-in which 15 wt % to 90 wt % of constituent fatty acids are ω3 fatty acids having less than 20 carbon atoms, and the like (Patent Document 4).

(Patent Document 1) JP-A-2001-40386
(Patent Document 2) JP-A-2002-322490
(Patent Document 3) JP-A-2002-138296
(Patent Document 4) JP-A-2002-138297

SUMMARY OF THE INVENTION

The present invention provides a fat or oil composition, which satisfies the following (1) to (4):
(1) a content of α-linolenic acid in constituent fatty acids of a fat or oil is 40 mass % or more;
(2) a total content of a saturated fatty acid having 16 carbon atoms and a saturated fatty acid having 18 carbon atoms in the constituent fatty acids of the fat or oil is 6 mass % or less, and a content of the saturated fatty acid having 18 carbon atoms in the constituent fatty acids of the fat or oil is less than 3 mass %;
(3) a content mass ratio of the saturated fatty acid having 16 carbon atoms (P) to the saturated fatty acid having 18 carbon atoms (S), [(P)/(S)], in the constituent fatty acids of the fat or oil is 0.1 or more and less than 3.5; and
(4) a content of diacylglycerols is 25 mass % or more.

DETAILED DESCRIPTION OF THE INVENTION

However, an investigation made by the inventors of the present invention revealed that, in a diacylglycerol-containing fat or oil rich in α-linolenic acid in constituent fatty acids, crystals were liable to precipitate to cause white turbidity or deposition under low temperature. In particular, there was a tendency that, as the concentration of diacylglycerols increased, crystallization was more liable to occur.

Therefore, the present invention relates to the provision of a fat or oil having diacylglycerols at a high content and rich in α-linolenic acid, in which crystallization at low temperature is suppressed, and which hardly causes white turbidity or deposition.

In order to solve the above-mentioned problem, the inventors of the present invention made extensive investigations with attention focused on a composition of the fatty acid of a fat or oil having diacylglycerols ata high content and rich in α-linolenic acid. As a result of such investigations, they found that such crystallization of fat or oil at low temperature can be suppressed by reducing the total amount of palmitic acid and stearic acid, in particular, the amount of stearic acid, and setting a ratio between palmitic acid and stearic acid to a certain range.

According to the present invention, there can be provided a fat or oil composition that has high contents of α-linolenic acid and diacylglycerols, and is excellent in physiological effects, and at the same time, hardly causes white turbidity or deposition under low temperature, and has a satisfactory appearance.

A fat or oil composition of the present invention satisfies the following (1) to (4):
(1) a content of α-linolenic acid in constituent fatty acids of a fat or oil is 40 mass % or more;
(2) a total content of a saturated fatty acid having 16 carbon atoms and a saturated fatty acid having 18 carbon atoms in the constituent fatty acids of the fat or oil is 6 mass % or less, and a content of the saturated fatty acid having 18 carbon atoms in the constituent fatty acids of the fat or oil is less than 3 mass %;
(3) a content mass ratio of the saturated fatty acid having 16 carbon atoms (P) to the saturated fatty acid having 18 carbon atoms (3), [(P)/(S)], in the constituent fatty acids of the fat or oil is 0.1 or more and less than 3.5; and
(4) a content of diacylglycerols is 25 mass % or more.

In the present invention, the fat or oil contains any one or more of monoacylglycerols, diacylglycerols, and triacylglycerols. The kind of the fat or oil is not particularly limited, and may be any fat or oil that can be used as an edible fat or oil.

In the present invention, the content of the fat or oil in the fat or oil composition is preferably 90 mass % (hereinafter simply "%") or more, more preferably 95% or more, from the standpoint of usability, and is preferably 100% or less. The content of the fat or oil in the fat or oil composition is preferably 90% or more and 100% or less, more preferably 95% or more and 100% or less.

In the present invention, the content of α-linolenic acid in the constituent fatty acids of the fat or oil, which is 40% or more, is preferably 45% or more, more preferably 50% or more, more preferably 52% or more, even more preferably 55% or more, from the standpoint of physiological effects, and is preferably 80% or less, more preferably 70% or less, even more preferably 60% or less, from the standpoint of oxidative stability.

The content of α-linolenic acid in the constituent fatty acids of the fat or oil is 40% or more and 80% or less, preferably 45% or more and 80% or less, more preferably 50% or more and 80% or less, more preferably 50% and 70% or less, more preferably 52% or more and 70% or less, more preferably 55% or more and 70% or less, even more preferably 55% or more and 60% or less. The amount of a fatty acid as used herein refers to an amount obtained by converting the fatty acid to a free fatty acid.

α-Linolenic acid is preferably cis α-linolenic acid from the standpoint of physiological effects, the standpoint of oxidative stability, and the standpoint of safety.

The content of cis α-linolenic acid in the constituent fatty acids of the fat or oil is preferably 35% or more, more preferably 40% or more, more preferably 45% or more, more preferably 47% or more, even more preferably 50% or more, and is preferably 80% or less, more preferably 68% or less, more preferably 62% or less, even more preferably 58% or less, from similar standpoints.

The content of cis α-linolenic acid in the constituent fatty acids of the fat or oil is preferably 35% or more and 80% or less, more preferably 40% or more and 80% or less, more preferably 45% or more and 80% or less, more preferably 47% or more and 68% or less, more preferably 47% or more and 62% or less, even more preferably 50% or more and 58% or less.

In the present invention, the total content of saturated fatty acids in the constituent fatty acids of the fat or oil, which is 6.0% or less, is preferably 5.5% or less, more preferably 5.0% or less, more preferably 4.5% or less, even more preferably 4.0% or less, from the standpoint of improving cool tolerance. In addition, the total content is preferably 0.5% or more from the standpoint of industrial productivity.

The total content of the saturated fatty acids in the constituent fatty acids of the fat or oil is preferably 0.5% or more and 6.0% or less, more preferably 0.5% or more and 5.5% or less, more preferably 0.5% or more and 5.0% or less, more preferably 0.5% or more and 4.5% or less, even more preferably 0.5% or more and 4.0% or less.

The kinds of the saturated fatty acids are not particularly limited, but are preferably saturated fatty acids having 14 to 24 carbon atoms, more preferably saturated fatty acids having 16 to 22 carbon atoms, even more preferably saturated fatty acids having 16 and 18 carbon atoms.

In the present invention, the total content of the saturated fatty acid having 16 carbon atoms and the saturated fatty acid having 18 carbon atoms in the saturated fatty acids is preferably 90% or more, more preferably 95% or more, even more preferably 100%.

In the present invention, the total content of the saturated fatty acid having 16 carbon atoms and the saturated fatty acid having 18 carbon atoms in the constituent fatty acids of the fat or oil, which is 6% or less, is preferably 5.5% or less, more preferably 5.0% or less, more preferably 4.5% or less, even more preferably 4.0% or less, from the standpoint of improving cool tolerance. In addition, the total content is preferably 0.5% or more, more preferably 1% or more, from the standpoint of industrial productivity.

The total content of the saturated fatty acid having 16 carbon atoms and the saturated fatty acid having 18 carbon atoms in the constituent fatty acids of the fat or oil is preferably 0.5% or more and 6.0% or less, more preferably 0.5% or more and 5.5% or less, more preferably 0.5% or more and 5.0% or less, more preferably 0.5% or more and 4.5% or less, more preferably 0.5% or more and 4.0% or less, even more preferably 1% or more and 4.0% or less.

In the present invention, cool tolerance can be improved particularly by reducing the content of the saturated fatty acid having 18 carbon atoms.

In the present invention, the content of the saturated fatty acid having 18 carbon atoms in the constituent fatty acids of the fat or oil, which is less than 3%, is preferably 2.5% or less, more preferably 2.0% or less, even more preferably 1.5% or less, from the standpoint of improving cool tolerance. In addition, the content is preferably 0.2% or more from the standpoint of industrial productivity.

The content of the saturated fatty acid having 18 carbon atoms in the constituent fatty acids of the fat or oil is preferably 0.2% or more and less than 3.0%, more preferably 0.2% or more and 2.5% or less, more preferably 0.2% or more and 2.0% or less, even more preferably 0.2% or more and 1.5% or less.

In addition, when the ratio of the content mass ratio of the saturated fatty acid having 16 carbon atoms (P) to the saturated fatty acid having 18 carbon atoms (S), [(P)/(S)], is set to a certain range, low-temperature tolerance at not only 5° C. but also 0° C. can be enhanced to further improve cool tolerance.

In the present invention, the content mass ratio of the saturated fatty acid having 16 carbon atoms (P) to the saturated fatty acid having 18 carbon atoms (S), [(P)/(S)], in the constituent fatty acids of the fat or oil, which is 0.1 or more and less than 3.5, is preferably 0.2 or more, more preferably 0.3 or more, even more preferably 0.4 or more, from the standpoint of improving cool tolerance, and is preferably 3.2 or less, more preferably 3.0 or less, from the standpoint of industrial productivity.

The content mass ratio of the saturated fatty acid having 16 carbon atoms (P) to the saturated fatty acid having 18 carbon atoms (S), [(P)/(S)], in the constituent fatty acids of the fat or oil is preferably 0.2 or more and less than 3.5, more preferably 0.3 or more and less than 3.5, more preferably 0.3 or more and 3.2 or less, even more preferably 0.4 or more and 3.0 or less.

The content of the saturated fatty acid having 16 carbon atoms in the constituent fatty acids of the fat or oil is preferably 4.6% or less, more preferably 4.3% or less, more preferably 3.6% or less, even more preferably 3.0% or less, from the standpoint of physiological effects and the standpoint of improving cool tolerance. In addition, the content is preferably 0.5% or more from the standpoint of industrial productivity.

The content of the saturated fatty acid having 16 carbon atoms in the constituent fatty acids of the fat or oil is preferably 0.5% or more and 4.6% or less, more preferably 0.5% or more and 4.3% or less, more preferably 0.5% or more and 3.6% or less, even more preferably 0.5% or more and 3.0% or less.

Examples of the other constituent fatty acids of the fat or oil include fatty acids having 14 to 24 carbon atoms, preferably 16 to 22 carbon atoms.

Of those, the content of linoleic acid (C18:2) in the constituent fatty acids of the fat or oil is preferably 5% or more, more preferably 10% or more, and is preferably 40% or less, more preferably 30% or less, even more preferably 20% or less, from the standpoint of industrial productivity.

The content of linoleic acid in the constituent fatty acids of the fat or oil is preferably 5% or more and 40% or less, more preferably 5% or more and 30% or less, even more preferably 10% or more and 20% or less.

In addition, the content of oleic acid (C18:1) in the constituent fatty acids of the fat or oil is preferably 10% or more, and is preferably 50% or less, more preferably 40% or less, even more preferably 30% or less, from the standpoint of industrial productivity.

The content of oleic acid in the constituent fatty acids of the fat or oil is preferably 10% or more and 50% or less, more preferably 10% or more and 40% or less, even more preferably 10% or more and 30% or less.

The fat or oil composition of the present invention comprises 25% or more of diacylglycerols. There is a tendency that, as the concentration of the diacylglycerols increases, crystals are more liable to precipitate to cause white turbidity or deposition under low temperature. Therefore, the present invention is preferably applied to a fat or oil having a high diacylglycerol content. The content of the diacylglycerols in the fat or oil composition is preferably 30% or more, more preferably 50% or more, more preferably 55% or more, more preferably 60% or more, more preferably 65% or more, more preferably 70% or more, more preferably 80% or more, more preferably 83% or more, even more preferably 85% or more, and is preferably 96% or less, more preferably 95% or less, even more preferably 94% or less, from the standpoint of effectively expressing effects and the standpoint of physiological effects.

The content of the diacylglycerols in the fat or oil composition is preferably 25% or more and 96% or less, more preferably 30% or more and 96% or less, more preferably 50% or more and 95% or less, more preferably 55% or more and 95% or less, more preferably 60% or more and 95% or less, more preferably 65% or more and 94% or less, more preferably 70% or more and 94% or less, more preferably 80% or more and 94% or less, more preferably 83% or more and 94% or less, even more preferably 85% or more and 94% or less.

In addition, from the standpoint of improving cool tolerance and the standpoint of the industrial productivity of the fat or oil, the content of the diacylglycerols in the fat or oil composition is preferably 25% or more and less than 70%, more preferably 25% or more and 60% or less, even more preferably 25% or more and 55% or less.

The fat or oil composition of the present invention preferably comprises triacylglycerols, and the content thereof is preferably 1% or more, more preferably 2% or more, even more preferably 5% or more, and is preferably 75% or less, more preferably 72% or less, more preferably 50% or less, even more preferably 25% or less, from the standpoint of the industrial productivity of the fat or oil.

The content of the triacylglycerols in the fat or oil composition is preferably 1% or more and 75% or less, more preferably 2% or more and 75% or less, more preferably 2% or more and 72% or less, more preferably 5% or more and 50% or less, even more preferably more5% or and 25% or less.

The content of monoacylglycerols in the fat or oil composition is preferably 3% or less, more preferably 2% or less, even more preferably 1% or less, and is preferably more than 0%, from the standpoints of taste and flavor, and the industrial productivity of the fat or oil. The content of the monoacylglycerols in the fat or oil composition may be 0%.

The content of a free fatty acid or a salt thereof in the fat or oil composition is preferably 3% or less, more preferably 2% or less, even more preferably 1% or less, and is preferably more than 0%, from the standpoint of taste and flavor.

The content of the free fatty acid or the salt thereof in the fat or oil composition may be 0%.

The triacylglycerols, the diacylglycerols, and the monoacylglycerols preferably have the same fatty acid composition from the standpoint of the industrial productivity of the fat or oil.

From the viewpoints of exhibiting the physiological effects of α-linolenic acid and diacylglycerols, and suppressing the occurrence of white turbidity and deposition under low temperature to achieve a satisfactory appearance, the fat or oil composition of the present invention is preferably a fat or oil composition that satisfies the following (1) to (4):
(1) the content of α-linolenic acid in constituent fatty acids of a fat or oil is from 50 to 70%;
(2) the total content of a saturated fatty acid having 16 carbon atoms and a saturated fatty acid having 18 carbon atoms in the constituent fatty acids of the fat or oil is from 1% to 6%, and the content of the saturated fatty acid having 18 carbon atoms in the constituent fatty acids of the fat or oil is 0.2% or more and less than 3.0%;
(3) the content mass ratio of the saturated fatty acid having 16 carbon atoms (P) to the saturated fatty acid having 18 carbon atoms (S), [(P)/(S)], in the constituent fatty acids of the fat or oil is 0.1 or more and less than 3.5; and
(4) the content of diacylglycerols is 25% or more, and further satisfies at least one of the following (5) to (9).
(5) The total content of saturated fatty acids in the constituent fatty acids of the fat or oil is from 1% to 6%.
(6) The content of linoleic acid in the constituent fatty acids of the fat or oil is from 10% to 20%.
(7) The content of oleic acid in the constituent fatty acids of the fat or oil is from 10% to 30%.
(8) The content of triacylglycerols is from 5% to 72%.
(9) The content of monoacylglycerols is 1% or less.

In addition, from similar viewpoints, the fat or oil composition of the present invention is more preferably a fat or oil composition that satisfies the following (1) to (4):
(1) the content of α-linolenic acid in constituent fatty acids of a fat or oil is from 50 to 70%;
(2) the total content of a saturated fatty acid having 16 carbon atoms and a saturated fatty acid having 18 carbon atoms in the constituent fatty acids of the fat or oil is from 1% to 5.5%, and the content of the saturated fatty acid having 18 carbon atoms in the constituent fatty acids of the fat or oil is from 0.2% to 2.5%;
(3) the content mass ratio of the saturated fatty acid having 16 carbon atoms (P) to the saturated fatty acid having 18 carbon atoms (S), [(P)/(S)], in the constituent fatty acids of the fat or oil is 0.2 or more and less than 3.5; and
(4) the content of diacylglycerols is from 70% to 94%, and further satisfies at least one of the following (5) to (9).
(5) The total content of saturated fatty acids in the constituent fatty acids of the fat or oil is from 1% to 5.5%.
(6) The content of linoleic acid in the constituent fatty acids of the fat or oil is from 10% to 20%.
(7) The content of oleic acid in the constituent fatty acids of the fat or oil is from 10% to 30%.
(8) The content of triacylglycerols is from 5% to 25%.
(9) The content of monoacylglycerols is 1% or less.

In addition, from similar viewpoints, the fat or oil composition of the present invention is even more preferably a fat or oil composition that satisfies the following (1) to (4):
(1) the content of α-linolenic acid in constituent fatty acids of a fat or oil is from 55% to 70%;
(2) the total content of a saturated fatty acid having 16 carbon atoms and a saturated fatty acid having 18 carbon atoms in the constituent fatty acids of the fat or oil is from 1% to 4%, and the content of the saturated fatty acid having 18 carbon atoms in the constituent fatty acids of the fat or oil is from 0.2% to 1.5%;
(3) the content mass ratio of the saturated fatty acid having 16 carbon atoms (P) to the saturated fatty acid having 18 carbon atoms (S), [(P)/(S)], in the constituent fatty acids of the fat or oil is from 1 to 2.5; and
(4) the content of diacylglycerols is from 70% to 94%, and further satisfies at least one of the following (5) to (9).
(5) The total content of saturated fatty acids in the constituent fatty acids of the fat or oil is from 1% to 4%.
(6) The content of linoleic acid in the constituent fatty acids of the fat or oil is from 10% to 20%.
(7) The content of oleic acid in the constituent fatty acids of the fat or oil is from 10% to 30%.
(8) The content of triacylglycerols is from 5% to 25%.
(9) The content of monoacylglycerols is 1% or less.

In addition, from the viewpoints of exhibiting the physiological effects of α-linolenic acid and diacylglycerols, and suppressing the occurrence of white turbidity and deposition under low temperature to achieve a satisfactory appearance, and the viewpoint of the industrial productivity of the fat or oil, the fat or oil composition of the present invention is preferably a fat or oil composition that satisfies the following (1) to (4):
(1) the content of α-linolenic acid in constituent fatty acids of a fat or oil is from 55% to 70%;
(2) the total content of a saturated fatty acid having 16 carbon atoms and a saturated fatty acid having 18 carbon atoms in the constituent fatty acids of the fat or oil is from 0.5% to 6%, and the content of the saturated fatty acid having 18 carbon atoms in the constituent fatty acids of the fat or oil is 0.2% or more and less than 3%;
(3) the content mass ratio of the saturated fatty acid having 16 carbon atoms (P) to the saturated fatty acid having 18 carbon atoms (S), [((P)/(S)], in the constituent fatty acids of the fat or oil is from 0.4 to 3.0; and
(4) the content of diacylglycerols is 25% or more and less than 70%, and further satisfies at least one of the following (5) to (9).
(5) The total content of saturated fatty acids in the constituent fatty acids of the fat or oil is from 0.5% to 6%.
(6) The content of linoleic acid in the constituent fatty acids of the fat or oil is from 10% to 20%.
(7) The content of oleic acid in the constituent fatty acids of the fat or oil is from 10% to 30%.
(8) The content of triacylglycerols is from 20% to 72%.
(9) The content of monoacylglycerols is 1% or less.

The fat or oil composition of the present invention may be prepared from a fat or oil containing diacylglycerols. As required, a general edible fat or oil may be blended.

The fat or oil containing diacylglycerols may be obtained, for example, by: an esterification reaction of fatty acids derived from a fat or oil with glycerin; or a transesterification reaction (glycerolysis) of a fat or oil with glycerin.

The esterification reaction and the glycerolysis reaction are broadly classified into: a chemical method involving using a chemical catalyst, such as an alkali metal or an alloy thereof, an oxide or hydroxide of an alkali metal or an alkaline earth metal, or an alkoxide of an. alkali metal or an alkaline earth metal; and an enzymatic method involving using an enzyme, such as a lipase.

Of those, an esterification reaction of fractionated fatty acids derived from a fat or oil, which are described later, with glycerin is preferred from the standpoint of controlling fatty acid composition, In the present invention, the fat or oil (edible fat or oil) maybe any of a plant-derived fat or oil and an animal-derived fat or oil. Examples thereof may include: plant-derived fats or oils, such as soybean oil, rapeseed oil, safflower oil, rice oil, corn oil, sunflower oil, cotton seed oil, olive oil, sesame oil, peanut oil, Job's tears seed oil, wheat germ oil, perilla oil, linseed oil, flaxseed oil, chia seed oil, sacha inchi oil, walnut oil, kiwi seed oil, salvia seed oil, grape seed oil, macadamia nut oil, hazelnut oil, pumpkin seed oil, camellia oil, tea seed oil, borage oil, palm oil, palm olein, palm stearin, coconut oil, palm kernel oil, cacao butter, sal butter, shea butter, and algae oil; animal-derived fats or oils, such as fish oil, lard, beef tallow, and butter fat; and transesterified oils, hydrogenated oils, and fractionated oils thereof.

Of those, from the standpoint of usability, a plant-derived fat or oil is preferably used, a liquid fat or oil excellent in low-temperature tolerance is more preferably used, and at least one of fat or oil selected from the group consisting of perilla oil, linseed oil, flaxseed oil, chia seed oil, and sacha inchi oil rich in α-linolenic acid is even more preferably used. The liquid fat or oil means a fat or oil that is in a liquid state at 20° C., when determined in accordance with a cold test described in Standard Methods for Analysis of Fats, Oils and Related Materials 2.3.8-27.

The fatty acids derived from a fat or oil may be obtained by hydrolyzing a fat or oil. As a method of hydrolyzing the fat or oil, there are given a high-temperature and high-pressure degradation method and an enzymatic degradation method. The high-temperature and high-pressure degradation method is a method involving adding water to a fat or oil, and subjecting the mixture to a reaction under high-temperature and high-pressure conditions, to thereby provide fatty acids and glycerin. In addition, the enzymatic degradation method is a method involving adding water to a fat or oil, and subjecting the mixture to a reaction under a low-temperature condition using a fat or oil hydrolytic enzyme as a catalyst, to thereby provide fatty acids and glycerin.

The hydrolysis reaction may be performed in accordance with a conventional method.

After the hydrolysis of the fat or oil, it is preferred that a hydrolysate be fractionated and a solid be removed. As a fractionation method, there are given a solvent fractionation method, a spontaneous fractionation method (dry fractionation method), and a wetting agent fractionation method.

As means for removing a precipitated solid, there are given, for example, settled separation, filtration, centrifugation, and a method involving mixing fatty acids with an aqueous solution of a wetting agent, followed by separation.

The esterification reaction of the fatty acids derived from a fat or oil with glycerin is preferably performed by an enzymatic method under mild conditions, which is excellent from the standpoint of, for example, taste and flavor.

The use amount of the enzyme may be appropriately decided in consideration of the activity of the enzyme. From the standpoint of enhancing the reaction rate, when an immobilized enzyme is used, the use amount is preferably from 1 mass % to 30 mass %, more preferably from 2 mass % to 20 mass %, with respect to 100 parts by mass of the total amount of raw materials for the esterification reaction.

The reaction temperature of the esterification reaction is preferably from 0° C. to 100° C., more preferably from 20° C. to 80° C., even more preferably from 30° C. to 60° C., from the standpoint of enhancing the reaction rate and the standpoint of suppressing inactivation of the enzyme. In addition, the reaction time is preferably 15 hours or less, more preferably from 1 hour to 12 hours, even more preferably from 2 hours to 10 hours, from the standpoint of industrial productivity.

As means for bringing the fatty acids and glycerin into contact with each other, there are given, for example, immersion, stirring, and a method involving passing a liquid through a column packed with an immobilized lipase through the use of a pump or the like.

After the esterification reaction, a refinement process to be generally used for a fat or oil may be performed. Specific examples thereof may include processes such as distillation treatment, acid treatment, water washing, decoloration, and deodorization.

The fat or oil composition of the present invention preferably comprises an antioxidant from the standpoint of oxidative stability.

The content of the antioxidant in the fat or oil composition is preferably 0.005% or more and 1.0% or less, more preferably 0.04% or more and 0.75% or less, even more preferably 0.08% or more and 0.5% or less, from the standpoints of , for example, taste and flavor, oxidative stability, and suppression of coloring.

The antioxidant is not particularly limited as long as the antioxidant is used for food, but is preferably at least one selected from the group consisting of, for example, a natural antioxidant, lecithin, tocopherol, ascorbyl palmitate, ascorbyl stearate, dibutylhydroxytoluene (BHT), and butylated hydroxyanisole (BHA).

The fat or oil composition of the present invention may be used in the same manner as a general edible fat or oil, and may be applied to various foods and beverages and feeds each using a fat or oil. Examples of the food and beverage include foods for specified health use and foods with function claims claiming to have the physiological effects of α-linolenic acid and diacylglycerols as well as general foods and beverages.

The form of the food and beverage may be a solid, a semisolid, or a liquid, and examples thereof include a beverage, a water-in-oil type fat or oil-containing food, an oil-in-water type fat or oil-containing food, a bakery food, confectionery, a frozen food, a retort food, and a composition for nutritional supplementation, such as a tablet, a capsule, or a troche.

Examples of the feed include: a livestock feed to be used for cattle, swine, or the like; a small-animal feed to be used for rabbits, mice, or the like; a fish and shellfish feed to be used for eels, prawns, or the like; and a pet food to be used for dogs, cats, or the like.

In relation to the above-mentioned embodiments, the present invention discloses the following fat or oil compositions.

<1> A fat or oil composition, which satisfies the following (1) to (4) :
(1) the content of α-linolenic acid in constituent fatty acids of a fat or oil is 40 mass % or more;
(2) the total content of a saturated fatty acid having 16 carbon atoms and a saturated fatty acid having 18 carbon atoms in the constituent fatty acids of the fat or oil is 6 mass % or less, and the content of the saturated fatty acid having 18 carbon atoms in the constituent fatty acids of the fat or oil is less than 3 mass %;
(3) the content mass ratio of the saturated fatty acid having 16 carbon atoms (P) to the saturated fatty acid having 18 carbon atoms (S), [(P)/(S)], in the constituent fatty acids of the fat or oil is 0.1 or more and less than 3.5; and
(4) the content of diacylglycerols is 25 mass % or more.

<2> The fat or oil composition according to <1>, wherein the content of the fat or oil in the fat or oil composition is preferably 90 mass % or more, more preferably 95 mass % or more, is preferably 100 mass % or less, and is preferably 90 mass % or more and 100 mass % or less, more preferably 95 mass % or more and 100 mass % or less. <3> The fat or oil composition according to <1> or <2>, wherein the content of α-linolenic acid in the constituent fatty acids of the fat or oil is preferably 45 mass % or more, more preferably 50 mass % or more, more preferably 52 mass %or more, even more preferably 55 mass % or more, is preferably 80 mass % or less, more preferably 70 mass % or less, even more preferably 60 mass % or less, and is preferably 40 mass % or more and 80 mass % or less, more preferably 45 mass % or more and 80 mass % or less, more preferably 50 mass % or more and 80 masses or less, more preferably 50 mass % or more and 70 mass % or less, more preferably 52 mass % or more and 70 mass % or less, more preferably 55 mass % or more and 70 mass % or less, even more preferably 55 mass % or more and 60 mass % or less.
<4> The fat or oil composition according to any one of <1 to <3>, wherein the content of cis a-linolenic acid in the constituent fatty acids of the fat or oil is preferably 35 mass % or more, more preferably 40 mass % or more, more preferably 45 mass % or more, more preferably 47 mass % or more, even more preferably 50 mass % or more, is preferably 80 mass % or less, more preferably 68 mass % or less, more preferably 62 mass % or less, even more preferably 58 mass % or less, and is preferably 35 mass % or more and 80 mass % or less, more preferably 40 mass % or more and 80 mass % or less, more preferably 45 mass % or more and 80 mass % or less, more preferably 47 mass % or more and 68 mass % or less, more preferably 47 mass % or more and 62 mass % or less, even more preferably 50 mass % or more and 58 mass % or less.
<5> The fat or oil composition according to any one of <1> to <4>, wherein the total content of the saturated fatty acid having 16 carbon atoms and the saturated fatty acid having 18 carbon atoms in the constituent fatty acids of the fat or oil is preferably 5.5 mass % or less, more preferably 5.0 mass % or less, more preferably 4.5 mass % or less, even more preferably 4.0 mass % or less, is preferably 0.5 mass % more preferably 1 mass % or more, and is preferably 0.5 mass % or more and 6.0 mass % or less, more preferably 0.5 mass % or more and 5.5 mass % or less, more preferably 0.5 mass % or more and 5.0 mass % or less, more preferably 0.5 mass % or more and 4.5 mass % or less, more preferably 0.5 mass % or more and 4.0 mass % or less, even more preferably 1 mass % or more and 4.0 mass % or less.
<6> The fat or oil composition according to any one of <1> to <5>, wherein the total content of saturated fatty acids in the constituent fatty acids of the fat or oil is preferably 6 mass % or less, more preferably 0.5 mass % or more and 6.0 mass % or less, more preferably 0.5 mass % or more and 5.5 mass % or less, more preferably 0.5 mass % or more and 5.0 mass % or less, more preferably 0.5 mass % or more and 4.5 mass % or less, even more preferably 0.5 mass % or more and 4.0 mass % or less.
<7> The fat or oil composition according to any one of <1> to <6>, wherein the content of the saturated fatty acid having 18 carbon atoms in the constituent fatty acids of the fat or oil is preferably 2.5 mass % or less, more preferably 2.0 mass % or less, even more preferably 1.5 mass % or less, is preferably 0.2 mass % or more, and is preferably 0.2 mas % or more and. less than 3.0 mass %, more preferably 0.2 mass % or more and 2.5 mass % or less, more preferably 0.2 mass % or more and 2.0 mass % or less, even more preferably 0.2 mass % or more and 1.5 mass % or less.

<8> The fat or oil composition according to any one of <1> to <7>, wherein the content mass ratio of the saturated fatty acid having 16 carbon atoms (P) to the saturated fatty acid having 18 carbon atoms (S), [(P)/(S)], in the constituent fatty acids of the fat or oil is preferably 0.2 or more, more preferably 0.3 or more, even more preferably 0.4 or more, is preferably 3.2 or less, more preferably 3.0 or less, and is preferably 0.2 or more and less than 3.5, more preferably 0.3 or more and less than 3.5, more preferably 0.3 or more and 3.2 or less, even more preferably 0.4 or more and 3.0 or less.

<9> The fat or oil composition according to any one of <1> to <8>, wherein the content of the saturated fatty acid having 16 carbon atoms in the constituent fatty acids of the fat or oil is preferably 4.6 mass % or less, more preferably 4.3 mass % or less, more preferably 3.6 mass % or less, even more preferably 3.0 mass % or less, is preferably 0.5 mass % or more, and is preferably 0.5 mass % or more and 4.6 mass % or less, more preferably 0.5 mass % or more and 4.3 mass % or less, more preferably 0.5 mass % or more and 3.6 mass % or less, even more preferably 0.5 mass % or more and 3.0 mass % or less.

<10> The fat or oil composition according to any one of <1 to <9>, wherein the content of linoleic acid in the constituent fatty acids of the fat or oil is preferably 5 mass % or more, more preferably 10 mass % or more, is preferably 40 mass % or less, more preferably 30 mass % or less, even more preferably 20 mass % or less, and is preferably 5 mass % or more and 40 mass % or less, more preferably 5 mass % or more and 30 mass % or less, even more preferably 10 mass % or more and 20 mass % or less.

<11> The fat or oil composition according to any one of <1> to <10>, wherein the content of oleic acid in the constituent fatty acids of the fat or oil is preferably 10 mass % or more, is preferably 50 mass % or less, more preferably 40 mass % or less, even more preferably 30 mass % or less, and is preferably 10 mass % or more and 50 mass % or less, more preferably 10 mass % or more and 40 mass % or less, even more preferably 10 mass % or more and 30 mass % or less.

<12> The fat or oil composition according to any one of <1> to <11>, wherein the content of the diacylglycerols in the fat or oil composition is preferably 30 mass % or more, more preferably 50 mass % or more, more preferably 55 mass % or more, more preferably 60 mass % or more, more preferably 65 mass % or more, more preferably 70 mass % or more, more preferably 80 mass % or more, more preferably 83 mass % or more, even more preferably 85 mass % or more, is preferably 96 mass % or less, more preferably 95 mass % or less, even more preferably 94 mass % or less, and is preferably 25 mass % or more and 96 mass % or less, more preferably 30 mass % or more and 96 mass % or less, more preferably 50 mass % or more and 95 mass % or less, more preferably 55 mass % or more and 95 mass % or less, more preferably 60 mass % or more and 95 mass % or less, more preferably 65 mass % or more and 94 mass % or less, more preferably 70 mass % or more and 94 mass % or less, more preferably 80 mass % or more and 94 mass % or less, more preferably 83 mass % or more and 94 mass % or less, even more preferably 85 mass % or more and 94 mass % or less.

<13> The fat or oil composition according to any one of <1> to <12>, wherein the content of triacylglycerols in the fat or oil composition is preferably 1 mass % or more, more preferably 2 mass % or more, even more preferably 5 mass % or more, is preferably 75 mass % or less, more preferably 72 mass % or less, more preferably 50 mass % or less, even more preferably 25 mass % or less, and is preferably 1 mass % or more and 75 mass % or less, more preferably 2 mass % or more and 75 mass % or less, more preferably 2 mass % or more and 72 mass % or less, more preferably 5 mass % or more and 50 mass % or less, even more preferably 5 mass % or more and 25 mass % or less.

<14> The fat or oil composition according to any one of <1> to <13>, wherein the content of monoacylglycerols in the fat or oil composition is preferably 3 mass % or less, more preferably 2 mass % or less, even more preferably 1 mass % or less, and is preferably more than 0 mass %, or is preferably 0 mass %.

<15> The fat or oil composition according to any one of <1> to <14>, wherein the content of a free fatty acid or a salt thereof in the fat or oil composition is preferably 3 mass % or less, more preferably 2 mass % or less, even more preferably 1 mass % or less, and is preferably more than 0 mass %, or is preferably 0 mass %.

<16> The fat or oil composition according to any one of <1> to <15>, wherein the fat or oil composition preferably comprises an oil obtained by an esterification reaction of fractionated fatty acids derived from a fat or oil with glycerin.

<17> The fat or oil composition according to <16>, wherein the fractionated fatty acids are preferably derived from at least one of fat or oil selected from the group consisting of perilla oil, linseed oil, flaxseed oil, chia seed oil, and sacha inchi oil.

<18> The fat or oil composition according to any one of <1> to <17>, wherein the fat or oil composition preferably comprises an antioxidant, more preferably at least one of antioxidant selected from the group consisting of a natural antioxidant, lecithin, tocopherol, ascorbyl palmitate, ascorbyl stearate, dibutylhydroxytoluene (BHT), and butylated hydroxyanisole (BHA).

<19> The fat or oil composition according to <18>, wherein the content of the antioxidant in the fat or oil composition is preferably 0.005 mass % or more and 1.0 mass % or less, more preferably 0.04 mass or more and. 0.75 mass % or less, even more preferably 0.08 mass % or more and 0.5 mass % or less.

<20> A food and beverage, comprising the fat or oil composition of any one of <1> to <19>.

<21> A feed, comprising the fat or oil composition of any one of <1> to <19>.

<22> A fat or oil composition, which satisfies the following (1) to (4):
(1) the content of α-linolenic acid in constituent fatty acids of a fat or oil is 50 mass % or more and 70 mass % or less;
(2) the total content of a saturated fatty acid having 16 carbon atoms and a saturated fatty acid having 18 carbon atoms in the constituent fatty acids of the fat or oil is 1 mass % or more and 6 mass % or less, and the content of the saturated fatty acid having 18 carbon atoms in the constituent fatty acids of the fat or oil is 0.2 mass % or more and less than 3.0 mass %;
(3) the content mass ratio of the saturated fatty acid having 16 carbon atoms (P) to the saturated fatty acid having 18 carbon atoms (S), [(P)/(S)], in the constituent fatty acids of the fat or oil is 0.1 or more and less than 3.5; and
(4) the content of diacylglycerols is 25 mass % or more.

<23> The fat or oil composition according to <22>, wherein the total content of saturated fatty acids in the constituent fatty acids of the fat or oil is 1 mass % or more and 6 mass % or less.

<24> The fat or oil composition according to <22> or <23>, wherein the content of linoleic acid in the constituent fatty acids of the fat or oil is 10 mass % or more and 20 mass % or less.
<25> The fat or oil composition according to any one of <22> to <24>, wherein the content of oleic acid in the constituent fatty acids of the fat or oil is 10 mass % or more and 30 mass % or less.
<26> The fat or oil composition according to any one of <22> to <25>, wherein the content of triacylglycerols in the fat or oil composition is 5 mass % or more and 72 mass % or less.
<27> The fat or oil composition according to any one of <22> to <26>, wherein the content of monoacylglycerols in the fat or oil composition is 1 mass % or less.
<28> The fat or oil composition according to any one of <22> to <27>, wherein the fat or oil composition comprises an oil obtained by an esterification reaction of fractionated fatty acids derived from a fat or oil with glycerin.
The fat or oil composition according to <28>, wherein the fractionated fatty acids are derived from linseed oil and/or flaxseed oil.
<30> A food and beverage, comprising the fat or oil composition of any one of <22> to <29>.
<31> A feed, comprising the fat or oil composition of any one of <22> to <29>.
<32 A fat or oil composition, which satisfies the following (1) to (4):
(1) the content of α-linolenic acid in constituent fatty acids of a fat or oil is 50 mass % or more and 70 mass % or less;
(2) the total content of a saturated fatty acid having 16 carbon atoms and a saturated fatty acid having 18 carbon atoms in the constituent fatty acids of the fat or oil is 1 mass % or more and 5.5 mass % or less, and the content of the saturated fatty acid having 18 carbon atoms in the constituent fatty acids of the fat or oil is 0.2 mass % or more and 2.5 mass % or less;
(3) the content mass ratio of the saturated fatty acid having 16 carbon atoms (P) to the saturated fatty acid having 18 carbon atoms (S) [(P)/(S)], in the constituent fatty acids of the fat or oil is 0.2 or more and less than 3.5; and
(4) the content of diacylglycerols is 70 mass % or more and 94 mass % or less.
<33> The fat or oil composition according to <32>, wherein the total content of saturated fatty acids in the constituent fatty acids of the fat or oil is 1 mass % or more and 5.5 mass % or less.
<34 The fat or oil composition according to <32> or <33>, wherein the content of linoleic acid in the constituent fatty acids of the fat or oil is 10 mass % or more and 20 mass % or less.
<35> The fat or oil composition according to any one of <32> to <34>, wherein the content of oleic acid in the constituent fatty acids of the fat or oil is 10 mass % or more and 30 mass % or less.
<36> The fat or oil composition according to any one of <32> to <35>, wherein the content of triacylglycerols in the fat or oil composition is 5 mass % or more and 25 mass % or less.
<37> The fat or oil composition according to any one of <32> to <36>, wherein the content of monoacylglycerols in the fat or oil composition is 1 mass % or less.
<38> The fat or oil composition according to any one of <32> to <37>, wherein the fat or oil composition comprises an oil obtained by an esterification reaction of fractionated fatty acids derived from a fat or oil with glycerin.
<39> The fat or oil composition according to <38>, wherein the fractionated fatty acids are derived from linseed oil and/or flaxseed oil.
<40> A food and beverage, comprising the fat or oil composition of any one of <32> to <39>.
<41> A feed, comprising the fat or oil composition of any one of <32> to <39>.
<42> A fat or oil composition, which satisfies the following (1) to (4):
(1) the content of α-linolenic acid in constituent fatty acids of a fat or oil is 55 mass % or more and 70 mass % or less;
(2) the total content of a saturated fatty acid having 16 carbon atoms and a saturated fatty acid having 18 carbon atoms in the constituent fatty acids of the fat or oil is 1 mass % or more and 4 mass % or less, and the content of the saturated fatty acid having 18 carbon atoms in the constituent fatty acids of the fat or oil is 0.2 mass % or more and 1.5 mass % or less;
(3) the content mass ratio of the saturated fatty acid having 16 carbon atoms (P) to the saturated fatty acid having 18 carbon atoms (S), [(P)/(S)], in the constituent fatty acids of the fat or oil is 1 or more and 2.5 or less; and
(4) the content of diacylglycerols is 70 mass % or more and 94 mass % or less.
<43> The fat or oil composition according to <42>, wherein the total content of saturated fatty acids in the constituent fatty acids of the fat or oil is 1 mass % or more and 4 mass % or less.
<44> The fat or oil composition according to <42> or <43>, wherein the content of linoleic acid in the constituent fatty acids of the fat or oil is 10 mass % or more and 20 mass % or less.
<45> The fat or oil composition according to any one of <42> to <44>, wherein the content of oleic acid in the constituent fatty acids of the fat or oil is 10 mass % or more and 30 mass % or less.
<46> The fat or oil composition according to any one of <42 to <45>, wherein the content of triacylglycerols in the fat or oil composition is 5 mass % or more and 25 mass % or less.
<47> The fat or oil composition according to any one of <42> to <46>, wherein the content of monoacylglycerols in the fat or oil composition is 1 mass % or less.
<48> The fat or oil composition according to any one of <42> to <47>, wherein the fat or oil composition comprises an oil obtained by an esterification reaction of fractionated fatty acids derived from a fat or oil with glycerin.
<49> The fat or oil composition according to <48>, wherein the fractionated fatty acids are derived from linseed oil and/or flaxseed oil.
<50> A food and beverage, comprising the fat or oil composition of any one of <42> to <49>.
<51> A feed, comprising the fat or oil composition of any one of <42> to <49>.
<52> A fat or oil composition, which satisfies the following (1) to (4):
(1) the content of α-linolenic acid in constituent fatty acids of a fat or oil is 55 mass % or more and 70 mass % or less;
(2) the total content of a saturated fatty acid having 16 carbon atoms and a saturated fatty acid having 18 carbon atoms in the constituent fatty acids of the fat or oil is 0.5 mass % or more and 6 mass % or less, and the content of the saturated fatty acid having 18 carbon atoms in the constituent fatty acids of the fat or oil is 0.2 mass % or more and less than 3 mass %;
(3) the content mass ratio of the saturated fatty acid having 16 carbon atoms (P) to the saturated fatty acid having 18 carbon atoms (S), [(P)/(S)], in the constituent fatty acids of the fat or oil is 0.4 or more and 3.0 or less; and (4) the content of diacylglycerols is 25 mass % or more and less than 70 mass %.

<53> The fat or oil composition according to <52>, wherein the total content of saturated fatty acids in the constituent fatty acids of the fat or oil is 0.5 mass % or more and 6 mass % or less.

<54> The fat or oil composition according to <52> or <53>, wherein the content of linoleic acid in the constituent fatty acids of the fat or oil is 10 mass % or more and 20 mass % or less.

<55> The fat or oil composition according to any one of <52> to <54>, wherein the content of oleic acid in the constituent fatty acids of the fat or oil is 10 mass % or more and 30 mass % or less.

<56> The fat or oil composition according to any one of <52> to <55>, wherein the content of triacylglycerols in the fat or oil composition is 20 mass % or more and 72 mass % or less.

<57> The fat or oil composition according to any one of <52> to <56>, wherein the content of monoacylglycerols in the fat or oil composition is 1 mass % or less.

<58> The fat or oil composition according to any one of <52> to <57>, wherein the fat or oil composition comprises an oil obtained by an esterification reaction of fractionated fatty acids derived from a fat or oil with glycerin.

<59> The fat or oil composition according to <58>, wherein the fractionated fatty acids are derived from linseed oil and/or flaxseed oil.

<60> A food and beverage, comprising the fat or oil composition of any one of <52> to <59>.

<61> A feed, comprising the fat or oil composition of any one of <52> to <59>.

EXAMPLES

Analysis Method (i) Composition of Glycerides in Fat or Oil

About 10 mg of a fat or oil sample and 0.5 mL of a trimethylsilylating agent ("Silylating agent TH," manufactured by Kanto Chemical Co., Inc.) were added in a glass sample vial, and the vial was sealed and heated at 70° C. for 15 minutes. 1.0 mL of water and 1.5 mL of hexane were added thereto, and the bottle was shaken. The bottle was left to stand, and then the upper layer was analyzed by gas-liquid chromatography (GLC).

<GLC Analysis Conditions>
(Conditions)
Apparatus: Agilent 6890 Series (manufactured by Agilent Technologies)
Integrator: ChemStation B 02.01 SR2 (manufactured by Agilent Technologies)
Column: DB-1ht 10 m×0.25 mm×0.2 μm (manufactured by Agilent J&W)
Carrier gas: 1.0 mL He/min
Injector: Split (1:50), T=340° C.
Detector: FID, T=350° C.
Oven temperature: The temperature was increased from 80° C. to 340° C. at a rate of 10° C./min, and maintained for 15 minutes.

(ii) Composition of Constituent Fatty Acids of Fat or Oil

Fatty acid methyl esters were prepared in accordance with "Preparation method for fatty acid methyl ester (2.4.1.-1996)" described in "Standard Method for the Analysis of Fats, Oils and Related Materials" edited by Japan Oil Chemists' Society, and the resultant fat or oil samples were subjected to measurement following the method of American Oil Chemists' Society Official Method Ce 1f-96 (GLC method).

<GLC Analysis Conditions>
Column: CP-SIL88 50 m×0.25 mm×0.2 μm (VARIAN)
Carrier gas: 1.0 mL He/min
Injector: Split (1:50), T=300° C.
Detector: FID, T=300° C.
Oven temperature: maintained at 150° C. for 5 min-increased at
1° C./min-maintained at 160° C. for 5 min-increased at
2° C./min-maintained at 200° C. for 10 min-increased at
10° C./min-maintained at 220° C. for 5 min

Examples 1 to 10 and Comparative Examples 1 to 6

Preparation of Fat or Oil Compositions

Fatty acids obtained by hydrolyzing linseed oil or flaxseed oil with an enzyme were cooled under various conditions, and precipitated fatty acids were fractionated by centrifugation to provide fractionated fatty acids.

300 Parts by mass of the fractionated fatty acids and 47 parts by mass of glycerin were mixed with each other, and subjected to an esterification reaction using a 1,3-selective lipase (manufactured by Novozymes A/S) as a catalyst immobilized to an ion exchange resin. The immobilized enzyme was separated by filtration, and then the product after the completion of the reaction was distilled by molecular distillation, followed by acid treatment and water washing (3 times with distilled water), to provide treated oils. The treated oils were deodorized to provide fat or oil compositions A to P.

The glyceride composition and fatty acid composition of each of the fat or oil compositions A to P are shown in Table 1.

TABLE 1

| | Fat or oil composition | Glyceride composition (%) | | | Fatty acid composition [%] | | | | | | | | | Total amount of (P) + (S) [%] | (P)/(S) |
|---|---|---|---|---|---|---|---|---|---|---|---|---|---|---|---|
| | | MAG | DAG | TAG | C16:0 | C18:0 | C18:1 | C18:2 | C18:3 total | C18:3 trans | C18:3 cis | C20:0 | others | | |
| Example 1 | A | 0.3 | 93.4 | 6.3 | 2.3 | 1.2 | 22.5 | 16.2 | 57.2 | 1.4 | 55.7 | 0.0 | 0.6 | 3.5 | 1.97 |
| Example 2 | B | 0.3 | 89.6 | 10.1 | 2.9 | 1.6 | 22.9 | 16.4 | 55.5 | 2.4 | 53.1 | 0.0 | 0.7 | 4.5 | 1.79 |

TABLE 1-continued

| | Fat or oil com- position | Glyceride composition (%) | | | Fatty acid composition [%] | | | | | C18:3 | | | | | Total amount of (P) + (S) [%] | (P)/ (S) |
|---|---|---|---|---|---|---|---|---|---|---|---|---|---|---|---|---|
| | | MAG | DAG | TAG | C16:0 | C18:0 | C18:1 | C18:2 | total | trans | cis | C20:0 | others | | |
| Example 3 | C | 0.5 | 85.3 | 14.2 | 3.4 | 2.0 | 23.2 | 16.7 | 53.9 | 3.2 | 50.7 | 0.0 | 0.8 | 5.4 | 1.68 |
| Comparative Example 1 | D | 0.5 | 92.0 | 7.5 | 4.7 | 3.6 | 21.2 | 15.3 | 53.8 | 1.5 | 52.3 | 0.0 | 1.4 | 8.3 | 1.32 |
| Example 4 | E | 0.1 | 87.7 | 12.2 | 0.8 | 0.6 | 22.9 | 16.6 | 58.2 | 1.4 | 56.8 | 0.0 | 0.9 | 1.4 | 1.19 |
| Example 5 | F | 0.1 | 85.6 | 14.3 | 0.7 | 2.0 | 22.7 | 16.2 | 57.5 | 1.4 | 56.1 | 0.0 | 0.9 | 2.6 | 0.34 |
| Example 6 | G | 0.3 | 87.4 | 12.3 | 3.5 | 1.1 | 22.3 | 16.1 | 55.9 | 1.7 | 54.2 | 0.0 | 1.0 | 4.6 | 3.05 |
| Example 7 | H | 0.3 | 85.4 | 14.3 | 4.2 | 1.2 | 22.4 | 16.1 | 55.2 | 2.0 | 53.3 | 0.0 | 0.9 | 5.4 | 3.38 |
| Comparative Example 2 | I | 0.2 | 85.1 | 14.7 | 4.0 | 0.8 | 22.1 | 15.9 | 56.3 | 1.3 | 55.0 | 0.0 | 0.9 | 4.9 | 4.85 |
| Comparative Example 3 | J | 0.0 | 85.3 | 14.7 | 1.4 | 3.0 | 22.4 | 16.1 | 56.4 | 1.3 | 55.1 | 0.0 | 0.7 | 4.5 | 0.47 |
| Comparative Example 4 | K | 0.0 | 87.1 | 12.9 | 4.8 | 1.7 | 21.8 | 15.7 | 55.0 | 1.3 | 53.8 | 0.0 | 0.9 | 6.6 | 2.83 |
| Example 8 | L | 0.0 | 28.1 | 71.7 | 3.5 | 2.4 | 18.4 | 15.6 | 59.5 | 0.7 | 58.8 | 0.0 | 0.6 | 5.9 | 1.47 |
| Example 9 | M | 0.1 | 51.0 | 48.8 | 2.3 | 2.5 | 20.1 | 15.8 | 58.5 | 0.9 | 57.6 | 0.0 | 0.8 | 4.8 | 0.95 |
| Comparative Example 5 | N | 0.1 | 28.0 | 71.9 | 4.7 | 3.7 | 22.6 | 15.0 | 52.9 | 0.7 | 52.3 | 0.0 | 1.0 | 8.4 | 1.29 |
| Comparative Example 6 | O | 0.2 | 51.0 | 48.8 | 4.7 | 3.6 | 22.0 | 15.0 | 53.2 | 1.0 | 52.2 | 0.0 | 1.4 | 8.3 | 1.30 |
| Example 10 | P | 0.0 | 88.1 | 11.9 | 1.6 | 0.9 | 12.2 | 17.8 | 66.8 | 0.3 | 66.5 | 0.0 | 0.8 | 2.5 | 1.73 |

MAG: Monoacylglycerols
DAG: Diacylglycerols
TAG: Triacylglycerols

Evaluation of Low-Temperature Tolerance

The fat or oil compositions A to P were dispensed in amounts of 30 g into glass vials (SV-50, manufactured by Nichiden-Rika Glass Co., Ltd.), which were capped and left to stand in a refrigerator at 5° C. or 0° C. for 1 day, and the presence or absence of crystals was visually confirmed by the following criteria. The results are shown in Table 2.
3: Clear
2: Crystals precipitated in a minute amount, and slightly deposited on the bottom surface.
1: Crystals precipitated as a whole to cause white turbidity or deposition.

As shown in Table 2, each of the fat or oil compositions of Examples 1 to 10 maintains a clear state under a low temperature of 5° C. and hardly had a bad appearance due to crystallization even at 0° C.

On the other hand, in the fat or oil composition of Comparative Example 5 having a concentration of diacylglycerols of 28%, crystals precipitated as a whole to cause white turbidity at 0° C., and in each of the fat or oil compositions of Comparative Example 6 and Comparative Example 1 having a concentration of diacylglycerols of 50% or more, crystals precipitated as a whole to cause deposition even at 5° C. In addition, the fat or oil compositions of Comparative Examples 2 to 4 were also inferior in cool tolerance.

TABLE 2

| Fat or oil com- position | Ex- am- ple 1 A | Ex- am- ple 2 B | Ex- am- ple 3 C | Com- par- ative Ex- am- ple 1 D | Ex- am- ple 4 E | Ex- am- ple 5 F | Ex- am- ple 6 G | Ex- am- ple 7 H | Com- par- ative Ex- am- ple 2 I | Com- par- ative Ex- am- ple 3 J | Com- par- ative Ex- am- ple 4 K | Ex- am- ple 8 L | Ex- am- ple 9 M | Com- par- ative Ex- am- ple 5 N | Com- par- ative Ex- am- ple 6 O | Ex- am- ple 10 P |
|---|---|---|---|---|---|---|---|---|---|---|---|---|---|---|---|---|
| 5° C. | 3 | 3 | 3 | 1 | 3 | 3 | 3 | 3 | 2 | 1 | 1 | 3 | 3 | 2 | 1 | 3 |
| 0° C. | 3 | 2 | 2 | 1 | 3 | 2 | 2 | 2 | 1 | 1 | 1 | 3 | 3 | 1 | 1 | 3 |

The invention claimed is:

1. A fat or oil composition, which satisfies the following (1) to (7):
(1) a content of α-linolenic acid in constituent fatty acids of a fat or oil is 57.2 mass % or more;
(2) a total content of a saturated fatty acid having 16 carbon atoms and a saturated fatty acid having 18 carbon atoms in the constituent fatty acids of the fat or oil is 6 mass % or less, and a content of the saturated fatty acid having 18 carbon atoms in the constituent fatty acids of the fat or oil is less than 3 mass %;
(3) a content mass ratio of the saturated fatty acid having 16 carbon atoms (P) to the saturated fatty acid having 18 carbon atoms (S), [(P)/(S)], in the constituent fatty acids of the fat or oil is from 0.4 to less than 3.5;
(4) a content of diacylglycerols is 50 mass % or more;
(5) a content of triacylglycerols is from 5 mass % to 50 mass %;

(6) a content of linoleic acid in the constituent fatty acids of the fat or oil is from 5 mass % to 40 mass %; and (7) a content of oleic acid in the constituent fatty acids of the fat or oil is from 10 mass % to 50 mass %.

2. The fat or oil composition according to claim 1, wherein the fat or oil composition comprises an oil obtained by an esterification reaction of fractionated fatty acids derived from a fat or oil with glycerin.

3. The fat or oil composition according to claim 2, wherein the fractionated fatty acids are derived from at least one of fat or oil selected from the group consisting of perilla oil, linseed oil, flaxseed oil, chia seed oil, and sacha inchi oil.

4. A food or beverage, comprising the fat or oil composition of claim 1.

5. A feed, comprising the fat or oil composition of claim 1.

6. A method for producing the fat or oil composition of claim 1, comprising performing an esterification reaction of fractionated fatty acids derived from a fat or oil with glycerin.

7. The method for producing the fat or oil composition according to claim 6, wherein the fractionated fatty acids are derived from at least one fat or oil selected from the group consisting of perilla oil, linseed oil, flaxseed oil, chia seed oil, and sacha inchi oil.

8. The method for producing the fat or oil composition according to claim 6, wherein the fractionated fatty acids are obtained by hydrolyzing a fat or oil using an enzyme.

9. The method for producing the fat or oil composition according to claim 6, wherein the esterification reaction of the fractionated fatty acids with glycerin is performed at a temperature from 0° C. to 100° C. by using an enzyme.

10. The fat or oil composition according to claim 1, wherein the content of α-linolenic acid in the constituent fatty acids of a fat or oil is from 57.2 mass % to 70 mass %.

11. The fat or oil composition according to claim 1, wherein the total content of the saturated fatty acid having 16 carbon atoms and a saturated. fatty acid having 18 carbon atoms in the constituent fatty acids of the fat or oil is from 1 mass % to 6 mass %.

12. The fat or oil composition according to claim 1, wherein the total content of the saturated fatty acid having 16 carbon atoms and a saturated fatty acid having 18 carbon atoms in the constituent fatty acids of the fat or oil is from 5 mass % or less.

13. The fat or oil composition according to claim 1, wherein the content of the saturated fatty acid having 18 carbon atoms in the constituent fatty acids of the fat or oil is from 0.2 mass % to less than 3.0 mass %.

14. The fat or oil composition according to claim 1, wherein the content mass ratio of the saturated fatty acid having 16 carbon atoms (P) to the saturated fatty acid having 18 carbon atoms (S), [(P)/(S)], in the constituent fatty acids of the fat or oil is from 0.4 to 3.0.

15. The fat or oil composition according to claim 1, wherein a content of the saturated fatty acid having 16 carbon atoms in the constituent fatty acids of the fat or oil is from 0.5 mass % to 4.6 mass %.

16. The fat or oil composition according to claim 1, wherein the content of linoleic acid in the constituent fatty acids of the fat or oil is from 10 mass % to 20 mass %.

17. The fat or oil composition according to claim 1, wherein the content of diacylglycerols is 60 mass % or more.

18. The fat or oil composition according to claim 1, wherein the content of diacylglycerols is 55 mass % or more.

19. The fat or oil composition according to claim 1, wherein the content mass ratio of the saturated fatty acid having 16 carbon atoms (P) to the saturated fatty acid having 18 carbon atoms (S), [(P)/(S)], in the constituent fatty acids of the fat or oil is from 0.4 to 3.2.

20. The fat or oil composition according to claim 1, wherein the content mass ratio of the saturated fatty acid having 16 carbon atoms (P) to the saturated fatty acid having 18 carbon atoms (S), [(P)/(S)], in the constituent fatty acids of the fat or oil is from 0.4 to 1.97.

\* \* \* \* \*

UNITED STATES PATENT AND TRADEMARK OFFICE
CERTIFICATE OF CORRECTION

| | | |
|---|---|---|
| PATENT NO. | : 11,758,916 B2 | Page 1 of 1 |
| APPLICATION NO. | : 16/471189 | |
| DATED | : September 19, 2023 | |
| INVENTOR(S) | : Rika Homma et al. | |

It is certified that error appears in the above-identified patent and that said Letters Patent is hereby corrected as shown below:

In the Claims

Column 20, Line 1, "saturated." should read --saturated--.

Signed and Sealed this
Seventh Day of November, 2023

Katherine Kelly Vidal
*Director of the United States Patent and Trademark Office*